May 14, 1946. M. J. O. LOBELLE 2,400,310
INTERCOMMUNICATION COUPLING DEVICE FOR USE IN CABLE
CONNECTIONS BETWEEN TUGS, GLIDERS, AND THE LIKE
Filed Dec. 27, 1944 5 Sheets-Sheet 1
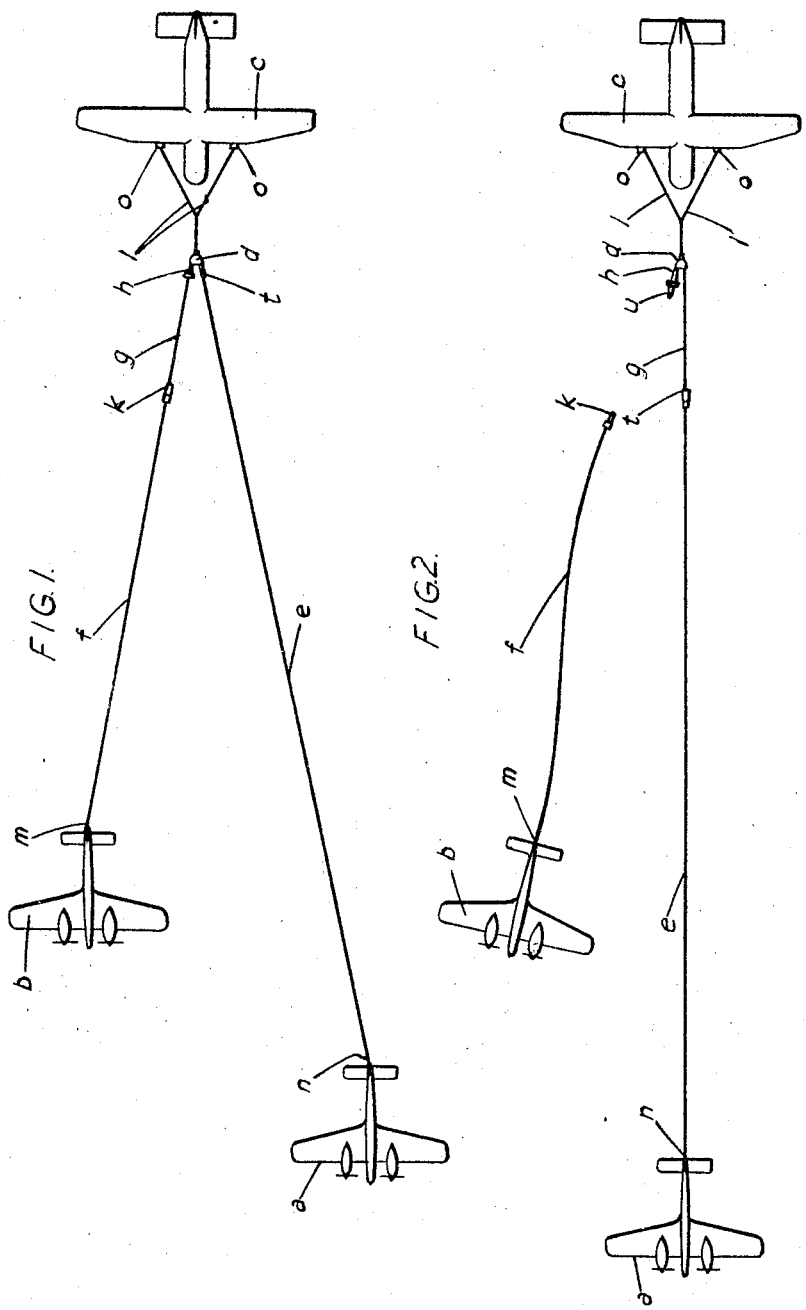
Inventor
MJO LOBELLE
by
Emery Holcombe Blair
Attorneys

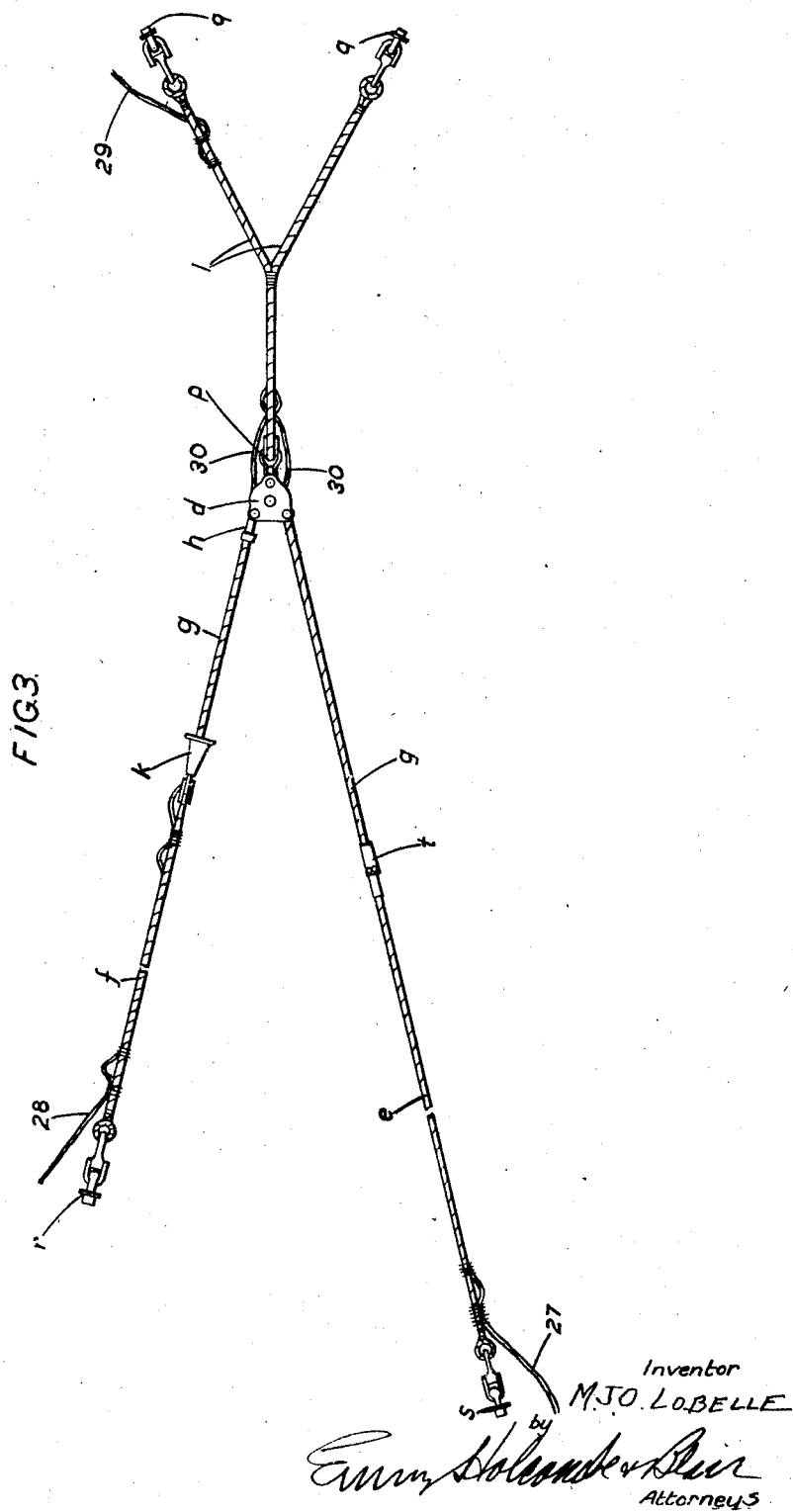

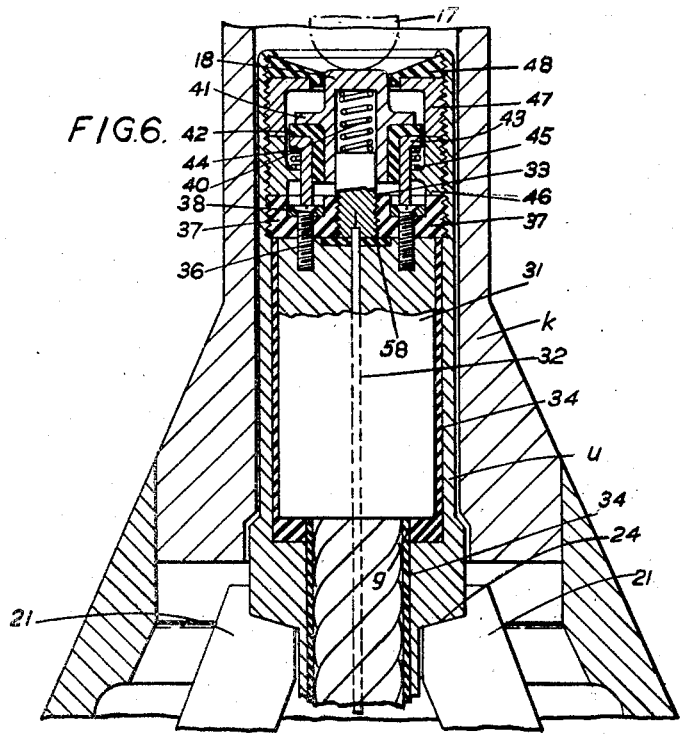
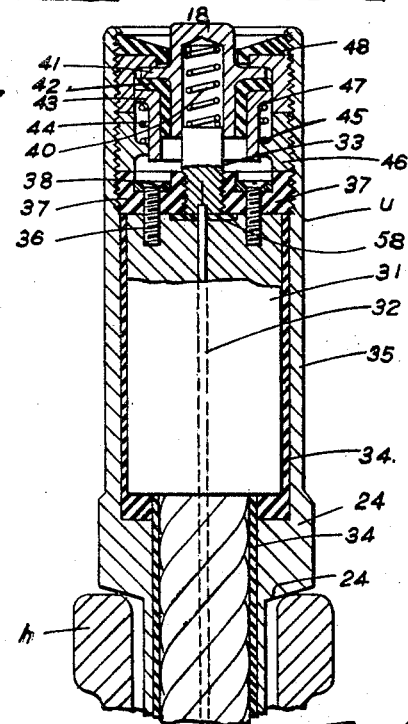

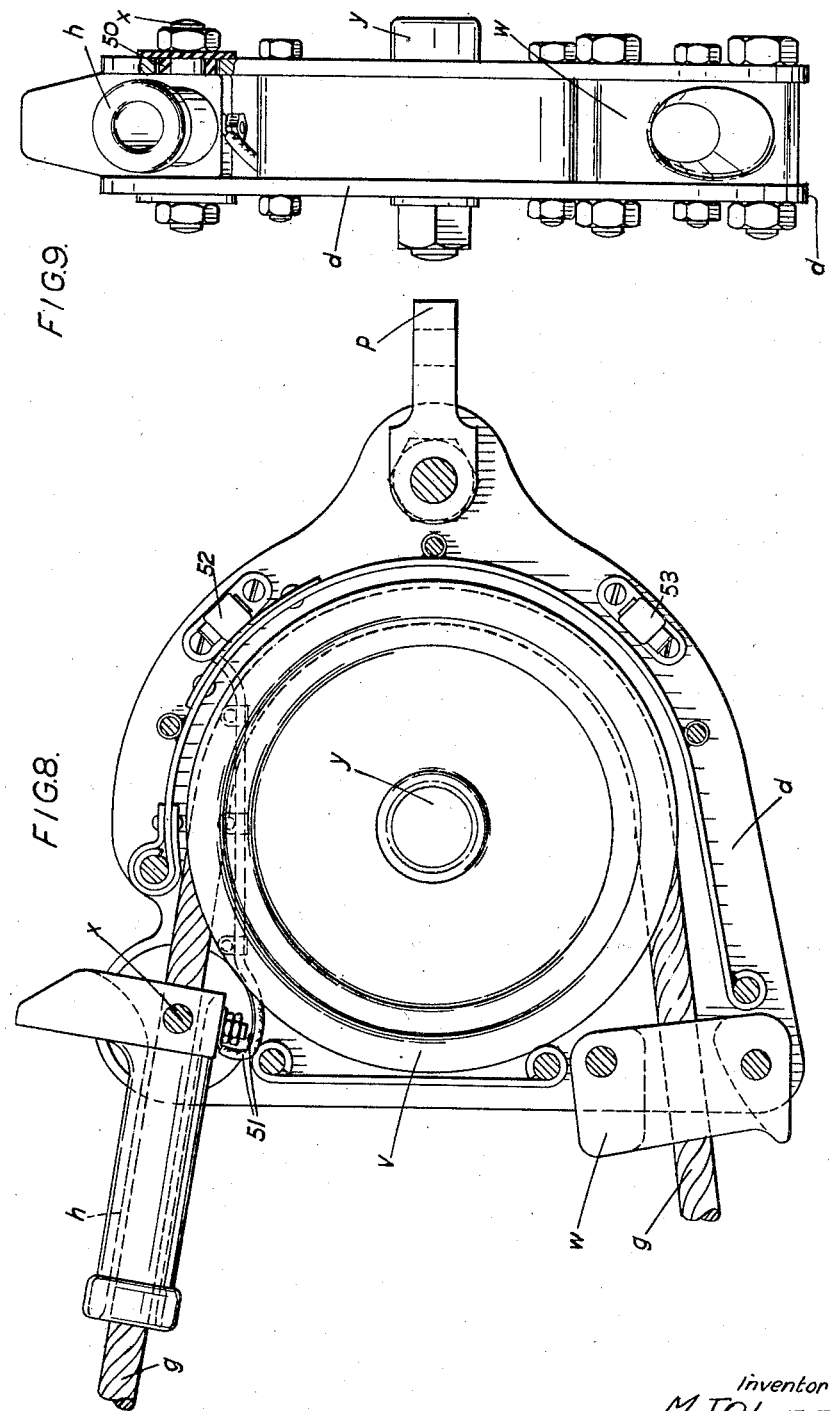

Patented May 14, 1946

2,400,310

UNITED STATES PATENT OFFICE 2,400,310

INTERCOMMUNICATION COUPLING DEVICE FOR USE IN CABLE CONNECTIONS BETWEEN TUGS, GLIDERS, AND THE LIKE

Marcel Jules Odilon Lobelle, Slough, England, assignor to Messrs. R. Malcolm Limited, Slough, Buckingham, England, a company of Great Britain Application December 27, 1944, Serial No. 569,968
In Great Britain December 21, 1943

4 Claims. (Cl. 174—70)

This invention relates to towing systems such as are used to enable aeroplanes serving as tugs to tow a glider, and it relates more particularly to such systems in which two tugs are used, one of which is the principal tug for towing the glider on to its destination, and the other is an assistant tug which only functions at the start until the principal tug and glider are sufficiently air-borne, when the assistant tug can release its connection. In such systems a junction plate is used having a bridle connecting it to the wings of the glider at widely separated points, and the cable connected to the two tugs passes round a sheave or pulley on the junction plate. This cable has stops in it which run through eyes on the junction plate to limit the extent of movement of the cable around the pulley. The portion of the cable connected to the assistant tug has a coupling which connects it to the cable leading to the principal tug, and this coupling is released when the assistant tug has served its purpose, the length of cable being then also disconnected from the assistant tug and dropped generally over the aerodrome, leaving the principal tug in sole control of the glider. The principal tug has ultimately to release its connection to the glider when it arrives in the neighbourhood of the destination of the glider, and this involves the provision of a suitable coupling and release device connecting the cable to the principal tug, and of course, suitable coupling and release devices on the glider also.

It is the object of the present invention to enable electrical connections to be established through suitable conductors in the cables, first between the two tugs to enable them to remain in communication while taking off and towing the glider, and subsequently between the principal tug and the glider when the principal tug is in sole control. This involves electrical connections between the lengths of the cable which must be carried through the cable release devices whereby the tugs are disconnected from their cables when they have done their work.

The assistant tug has a length of cable attached to it with a coupling at its end adapted to engage a spigot member on the end of the length of cable leading through the junction plate to the principal tug. When the assistant tug is throttled down prior to disconnection, it allows the cable to run back around the pulley on the junction plate until a plug member on the junction plate comes against the coupling and releases its jaws from the spigot member. The assistant tug is then free and can jettison its length of cable by a coupling and release device at the other end thereof. The spigot member on the length of cable connected to the principal tug now applies its pull to the glider through the plug member on the junction plate. The present invention is concerned with the electrical connections.

The cables used may be assumed to be of a type in which a telephone wire passes through the core of each cable, and the return conductor is either the cable itself or another wire in it. What is required is that the central telephone wires in the cables between the two tugs shall be connected, and a return circuit completed between them so long as the two tugs are in action, but when the assistant tug is disconnected the cables still connecting the principal tug to the glider must provide a direct telephone connection from the principal tug to the glider, which is only interrupted when the principal tug is disconnected from the glider prior to the landing of this latter.

According to the present invention telephone circuits are provided first between the two tugs and later between the principal tug and the glider through telephone conductors in the cables, for which purpose the one telephone wire connected to the telephone of the principal tug terminates in an insulated spring contact member in a spigot on the end of a cable connected to the principal tug, this spigot being adapted to engage in a coupling on the end of the cable connected to the assistant tug, this coupling having a plunger which makes connection with said spring contact member so long as the coupling is in action, the release of this coupling serving to permit the spring contact member to advance and make contact with an insulated sheath on the spigot member, which sheath then bears against a plug member on a junction plate to which the glider is attached, this plug member being connected to one of the telephone leads from the glider.

Further features of the invention will be apparent from the following description with reference to the drawings and will be defined by the claims at the end hereof.

In the drawings:

Figure 1 is a diagram of the twin tug towing system in use;

Figure 2 is a similar view showing the conditions just after the assistant tug has released its cable connection;

Figure 3 shows the cables and a junction plate to a larger scale;

Figure 6 shows in section the spigot member of this coupling, which is on a length of cable connected to the principal tug, in the condition which it assumes while the coupling is in action;

Figure 7 shows the spigot member when released from the coupling;

Figure 8 is a face view of a suitable form of junction plate for connection to a glider, the junction plate being shown with its top plate removed; and Figure 9 is an end view of this junction plate.

Figures 4, 5:
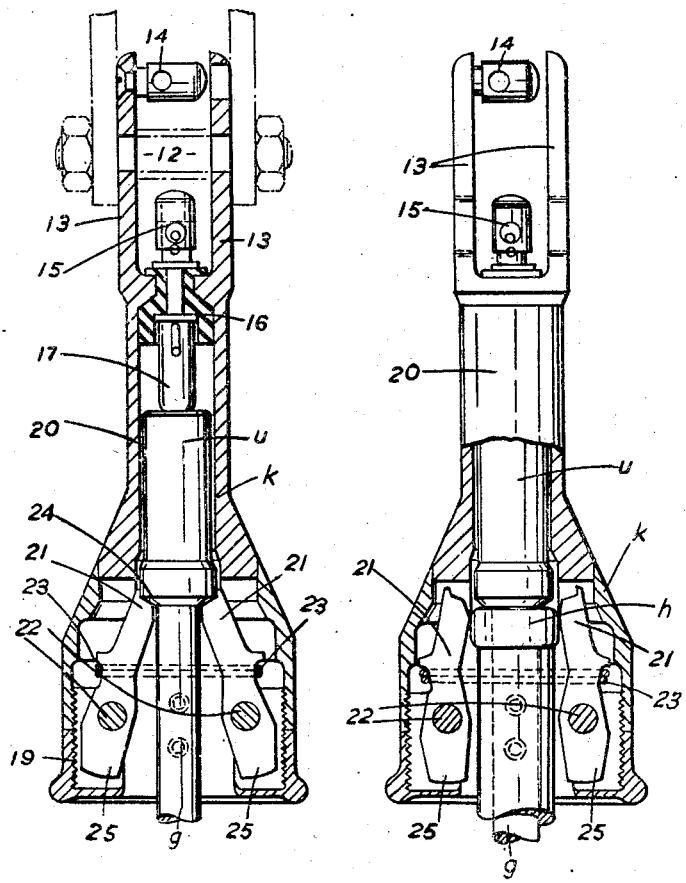
Figure 4 is a sectional view of a suitable coupling attached to the end of the cable from the assistant tug, showing the coupling in action.
Figure 5 is a similar view to Figure 4 showing the coupling at the moment of release.

Referring first to Figures 1 and 2, a is the principal tug, b the assistant tug, and c the glider being towed. The junction plate d is connected to the glider by a bridle l which is generally of hemp rope. The cable e, generally of steel, is connected to the tug a, and cable f is connected to the tug b. Between these two cables is a length of cable g which passes through the junction plate and has a stop or buffer t at one end where it is connected to cable e, while its other end carries a spigot member u hereinafter described (Figures 6 and 7) for engaging with a coupling k, (Figures 4 and 5) at the rear end of cable f. At the junction plate the cable g passes round a pulley v (Figures 8 and 9) and through a hollow plug member h which serves to release the coupling k when this is engaged by the plug member h as hereinafter described (Figure 5). So long as the assistant tug is in action at the start of a flight, the buffer or stop t is generally kept up against the junction plate d as in Figure 1, because the assistant tug b is then pulling rather more strongly than the principal tug a, so as to make sure that the coupling k is kept away from the plug member h on the junction plate. The length of cable g however allows of some to-and-fro motion of the cables relative to the junction plate without operating the release device in case the principal tug tends to go ahead momentarily.

When the tugs a and b and the glider c are in flight and at a sufficient altitude for safety, the pilot of the assistant tug b throttles down his engines somewhat until the coupling k comes against the plug h while the principal tug a advances to the corresponding extent relatively to the glider c, and the coupling k is released. Figure 2 shows the condition of affairs just after this release has been effected, with the length of cable f still attached to the assistant tug b. The assistant tug then diverges from the previous direction of flight and operates a release at m so as to discard the length of cable f, generally allowing it to fall within the area of the airfield from which the flight started. The length of cable g is still connected to the junction plate by the spigot member u engaging the plug member h so that the glider can be towed by the principal tug a, which continues in flight to tow the glider c to its destination. Couplings at n on the principal tug a and at o on the glider c are then released to discard the cables e and g and the junction plate d, with the bridle l connecting it to the glider.

Figure 3 shows the towing connections to a larger scale, indicating a suitable shackle connection at p for uniting the bridle l to the junction plate d, and plug terminals q on the ends of the bridle for engaging with the releasable couplings at o on the glider. Similar plug terminals are shown at r on the leading end of cable f, and at s on the leading end of cable e for engagement with the couplings at m and n respectively on the assistant tug b and the principal tug a.

Referring now to Figures 4 and 5 which show one form of this coupling, the loop on the end of cable f is engaged with the cross pin 12 which extends between the side cheeks 13 of the part 20 of the socket member k. One of these side cheeks also carries an electric terminal 14 for one of the leads of the intercommunication telephone, which leads are carried through the cores of all the cables and suitably inter-connected. A second terminal 15 is mounted in insulating bushes 16 fixed within the socket member. This terminal 15 carries a spring plunger 17 which, when the spigot u is engaged in socket k, makes contact with a thimble member 18 in the head of the spigot u.

The body of the socket portion 20 is slotted to accommodate a pair of spring pawls 21 mounted on pivot pins 22 which pass through holes in the part 20 and are held in place by the screwing of the end portion 19 over part 20 where it forms a shroud around the pawls. Springs 23 draw the upper ends of the pawls 21 inwardly causing them to engage behind the shoulder at 24 on the spigot u. The pawls 21 have tail pieces 25 designed to balance them statically about their pivots 22 so that, when the coupling is being bumped and jolted over the ground during the take-off, there should be no risk that the jolts would cause either of the pawls to release its hold on the spigot u.

When the socket k comes into engagement with the plug member h as shown in Figure 5, the head end of the plug member presses back the pawls 21 disengaging them from the shoulder 24 on the spigot u and so allowing the socket to separate from the spigot u. This spigot then remains bearing against the end of plug member h to transmit the pull from the cables e and g to the junction plate d and so through the bridle l to the glider c. The engaging surfaces of the pawls 21 and the shoulder at 24 are so shaped that the pawls can be pressed apart over the face of the shoulder when under load.

The cable g which passes around the pulley v on the junction plate d is also passed through a hollow plug member h pivoted in an insulating support at x on the junction plate (Figures 8 and 9) and the end of this cable has the spigot member u attached to it as shown in Figures 6 and 7 to which reference will now be made. The cable has a block 31 swaged about its end, and the central insulated telephone wire 32 from the cable g is carried up through this block to a pin 33. The block 31 is covered by insulation 34 and over this fits the metal sheath 35 formed with a shoulder at 24 for engaging with the pawls 21 of the coupling. The sheath 35 is threaded internally near the top and has an insulating disc 37 screwed into it down upon the end of the block 31. This disc has a groove accommodating an annular conductor 38 fixed by screws 36 into the block 31 so as to be conductingly connected to the sheath of the cable g which forms the return telephone lead. The other lead 32 is connected to the pin 33 as already stated. This pin 33 is screwed into the centre of the insulating disc 37 against a washer 58 of insulating material so that only the telephone lead 32 is conductingly connected to the pin 33. Upon the pin 33 slides a thimble 18 pressed outwardly by a spring 40, this thimble constituting the contact which is engaged by the spring plunger 17 in the coupling, Figure 4. The thimble 18 has a flange 41 beneath which is an insulating ferrule 42 carrying a flanged conducting sleeve 43. The thimble 18, flange 41, ferrule 42 and sleeve 43 move together and are normally pressed outwardly by spring 40 and also by a spring 44 which bears against a shoulder 45 in a cylinder 46 screwed into the sheath 35. Upon the top of cylinder 46 is screwed down another cylinder 47 with a flange which overlies the flange of sleeve 43, while an insulating collar 48 is screwed down over the flange of cylinder 47 and the top of the sheath 35 is spun inwardly over the insulator 48. With this construction, when the spring plunger 17 in the coupling k bears on the thimble 18 it presses this down as in Figure 6, forcing the base of sleeve 43 into contact with the conducting ring 38, so completing the connection between the cable g and the sheath 35 through the ring 38, sleeve 43 and the cylinder 46, as in Figure 6. The socket portion of the coupling connected to the terminal 14 therein then completes the circuit from the cable f to cable g through the pawls 21 engaging with sheath 35. When the spigot is clear of its coupling k and the thimble 18 is free to move outwardly, the connections are changed as in Figure 7 in which the thimble 18 now makes contact through its flange 41 with the internal flange in cylinder 47, so connecting the internal telephone lead 32 through 18 and 47 to the sheath 35 which is now resting against the end of plug member h on the junction plate d.

Referring now to Figures 8 and 9, it is seen that the pulley v is pivoted on an axis y between two side plates of the junction plate d, and the cable g enters through a passage in a block w, embraces the pulley v, and emerges again through the hollow plug member h which is pivoted on an insulated mounting at x between the side plates. It is the block w against which the buffer t bears while the assistant tug is in action, and the plug member h against which the spigot u bears when the principal tug a is towing alone.

The plug member h is insulated from the junction plate d by the insulating mounting 50, and has a flexible conducting connection 51 to a terminal 52 mounted with insulation on the plate d. Another terminal 53 is in direct metallic connection with the junction plate d. The telephone on the glider is connected to two leads 30, Figure 3, one of which is connected to the terminal 52 and the other to 53, so that when the spigot member u is resting against the plug member h, the connection from terminal 52 is completed through member h and the insulated sheath 35 to the internal cable lead 32 as already described, while the other conductor 30 is coupled through the junction plate d, pulley v and block w to the outer conductor of cable g.

The cables f and g are connected through a buffer connector t as already mentioned which forms a stop coming against block w when the assistant tug is in action pulling on cables f and g. The telephone leads between cables f and g are completed through this buffer connector t, which directly connects the cables themselves as return conductors while the internal telephone leads of the two cables are connected through an insulating sleeve inside the connector. At the other ends of cables e and f simple connections can be made to the telephones on the two tugs a and b, the leads 27, Figure 3, being connected to terminals from which they will easily pull out when the plug terminal s is released from the principal tug a. Similarly the leads 28 from cable f are connected to terminals on the assistant tug b from which they will easily pull out when the plug terminal r is released on the assistant tug to jettison the length of cable f. These connections are not illustrated as they form no feature of this invention.

It will be evident that the mechanical details of the coupling system may be modified without affecting the scope of this invention. The coupling on the end of the cable leading to the assistant tug may be of any convenient type provided it has a contact for engaging with the spring contact member 18 in the spigot, and is adapted to be disengaged when pressed against the plug member h. Again, instead of two lengths of cable e and f connected by a stop or buffer t, the same result will be attained if a single length of cable is used with a mechanical stop or buffer fixed thereon in the position of the stop t. These and other similar modifications will be obvious without further explanation.

I claim:

1. An electrical intercommunication device for use in a system of cables for connecting two tugs to a body to be towed and for releasing the connection to one of said tugs while leaving the other operative, comprising a length of cable for attachment to a principal tug, another length of cable for attachment to an assistant tug, a coupling device for connecting together said lengths of cable, a junction plate through which said first mentioned length of cable passes, towing connections extending from said junction plate adapted for connection to the body to be towed, an insulated conductor in each of said cables and an insulated conductor extending along said towing connections, a plug member through which said first mentioned length of cable passes and an insulating mount for supporting said plug member on said junction plate, said plug member being connected to said insulated conductor which extends along said towing connections, said coupling device also comprising spring contacts adapted when said coupling is in engagement to interconnect the insulated conductors in said cables, and said plug member being adapted to effect disconnection of said coupling device by pressure thereagainst and then to make electrical contact with the said spring contact in the part of said coupling device connected to said first mentioned cable.

2. An electrical intercommunication device for use in a system of cables for connecting two tugs to a body to be towed and for releasing the connection to one of said tugs while leaving the other operative, comprising a length of cable for attachment to a principal tug, another length of cable for attachment to an assistant tug, means for coupling together said lengths of cable comprising a jawed coupling element and a spigot element, the one on the end of one cable and the other on the end of the other cable, a spring contact member in one of said coupling elements and a coacting contact member in the other of said elements, a junction plate through which said first mentioned length of cable passes, towing connections extending from said junction plate adapted for connection to the body to be towed, an insulated conductor in each of said cables, and an insulated conductor extending along said towing connections, a plug member through which said first mentioned length of cable passes, and an insulating support therefor on said junction plate, the insulated conductor extending along said towing connections being electrically connected to said plug member, one element of said coupling means also comprising a spring contact in electrical connection with the insulated conductor in one length of cable, and the other such element comprising a plunger in electrical connection with the insulated conductor in the other length of cable, said plunger being adapted to depress said spring contact so long as said coupling elements are in engagement, whereby to interconnect said insulated conductors in said lengths of cable, said plug member being adapted to disengage said coupling elements on contact therewith and to make electrical contact with said spring contact member in the one of said coupling elements after such disengagement, whereby the insulated conductor in said first mentioned length of cable is then electrically connected to the aforementioned insulated conductor extending along said towing connections.

3. An electrical intercommunication device for use in a system of cables for connecting two tugs to a body to be towed and for releasing the connection to one of said tugs while leaving the other operative, comprising a length of cable for attachment to a principal tug, another length of cable for attachment to an assistant tug, means for coupling together said lengths of cable comprising a jawed coupling element and a spigot element, the one on the end of one cable and the other on the end of the other cable, a spring contact member in one of said coupling elements and a coacting contact member in the other of said elements, a junction plate through which said first mentioned length of cable passes, towing connections extending from said junction plate adapted for connection to the body to be towed, an insulated conductor in each of said cables, and an insulated conductor extending along said towing connections, a plug member through which said first mentioned length of cable passes, and an insulating support therefor on said junction plate, the insulated conductor extending along said towing connections being electrically connected to said plug member, one element of said coupling means also comprising a spring contact in electrical connection with the insulated conductor in one length of cable, and the other such element comprising a plunger in electrical connection with the insulated conductor in the other length of cable, and adapted to depress said spring contact so long as said coupling elements are in engagement, whereby to interconnect said insulated conductors in said lengths of cable, an insulated conducting sheath on the said coupling element which carries said spring contact, said sheath having a portion thereon adapted to make electrical contact with said spring contact member when it is released from the pressure of said plunger, said plug member being adapted to disengage one of said coupling elements from the other upon contact with one of said coupling elements, and thereafter to establish electrical connection with said insulated conducting sheath whereby electrical connection is established from the insulated conductor in said first mentioned length of cable to the insulated conductor extending along said towing connections.

4. An electrical intercommunication device for use in a system of cables for connecting two tugs to a body to be towed, comprising a length of cable for attachment to a principal tug, another length of cable for attachment to an assistant tug, a junction plate through which said first mentioned length of cable passes, and means of connection between said junction plate and the body to be towed, insulated electrical conductors in each of said cables and extending along said means of connection from said junction plate, a jawed coupling at one end of said second mentioned length of cable and a spigot adapted to engage in said coupling on one end of said first mentioned length of cable, a plug member and an insulated mount therefor on said junction plate, said plug member being in electrical connection with one of the insulated conductors extending along the means of connection from said junction plate to the body to be towed, said plug member also having a passage therein through which said first mentioned length of cable passes and having a head adapted to release said jawed coupling from said spigot, a spring contact member and an insulating mount therefor in said spigot, an insulated sheath on said spigot having a flanged member therein adapted to make contact with said spring contact member when said contact member is free, and a terminal in said coupling adapted to depress said spring contact member when said coupling is engaged with said spigot.

MARCEL JULES ODILON LOBELLE.